United States Patent Office 3,242,774
Patented Mar. 29, 1966

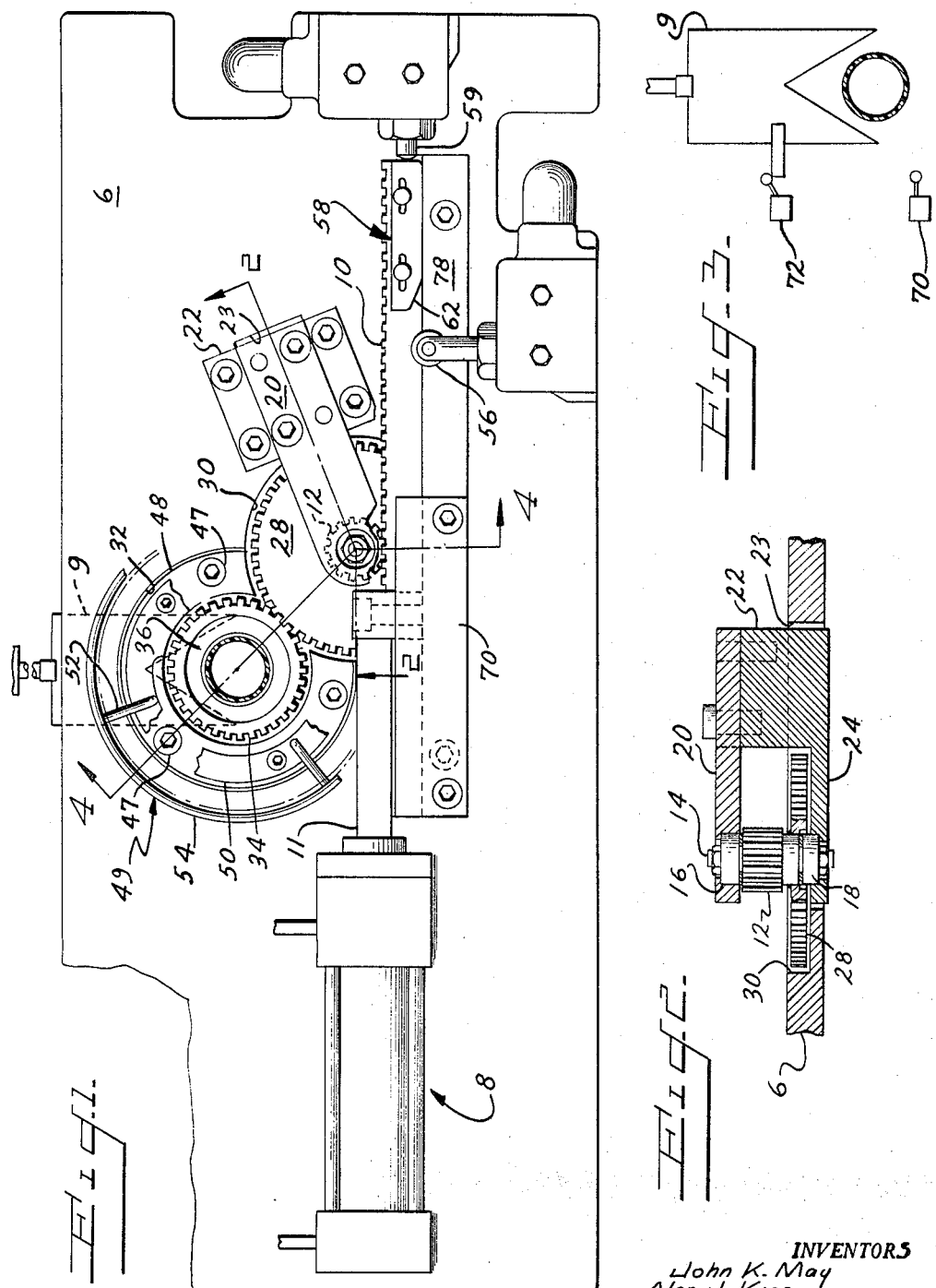

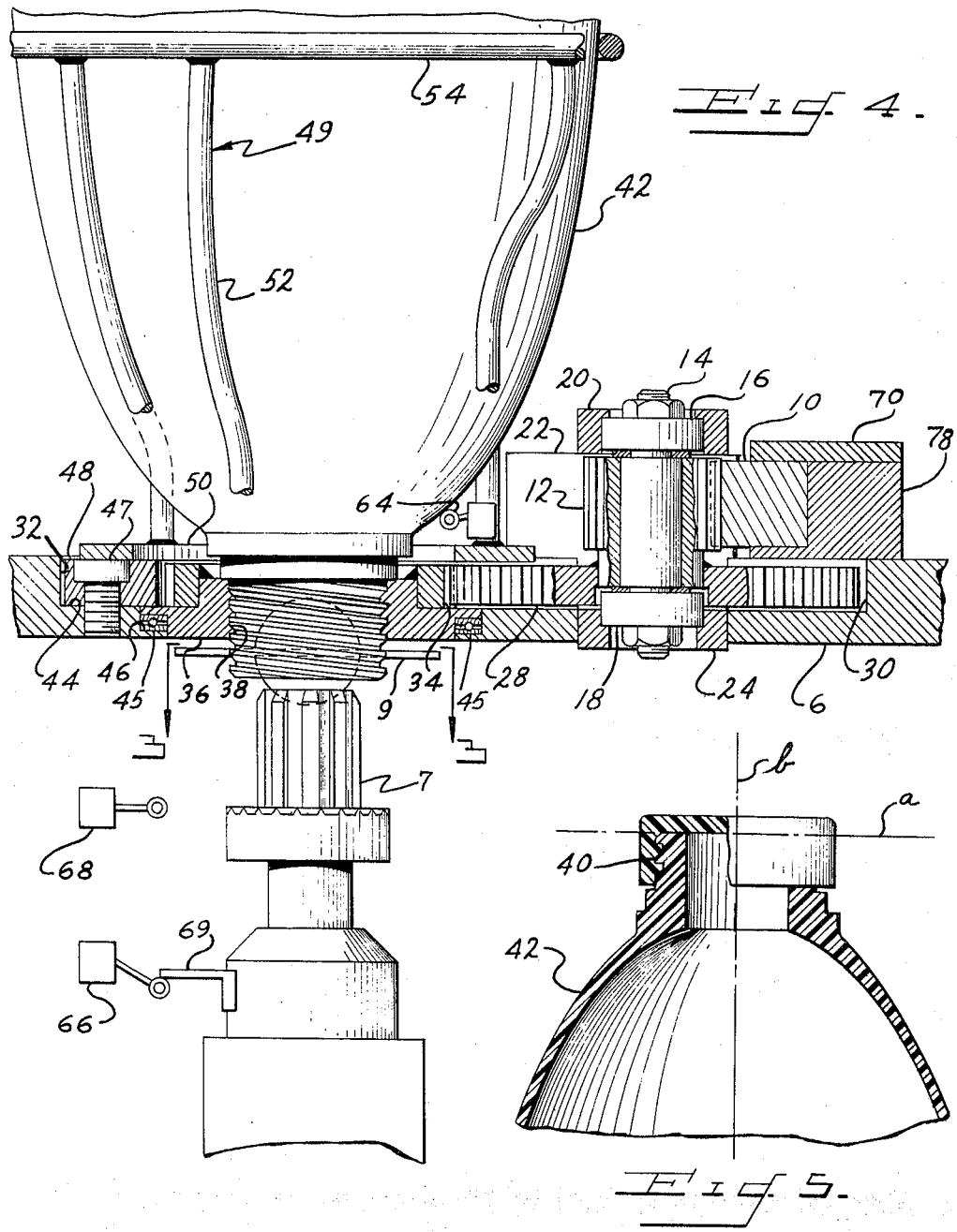

3,242,774
BOTTLE MACHINING FIXTURE
John K. May, Northampton, and Alan J. King, Southampton, Mass., assignors to Pro-Phy-Lac-Tic Brush Company, Florence, Mass., a corporation of Delaware
Filed Aug. 6, 1963, Ser. No. 300,368
5 Claims. (Cl. 77—73)

This invention relates to the manufacture of plastic bottles and the like, and more particularly to fixtures for use in machining the neck portions of bottles.

The principal object of this invention is to provide a novel fixture for positioning and holding plastic bottles to insure accurate machining of the end surfaces of threaded bottle necks. The machining operation is to remove any flashing or excess plastic remaining from the molding operation, and to finish the end of the bottle neck to a plane which is perpendicular to the thread axis, thus providing for proper seating of bottle tops.

It is another object of this invention to provide a fixture of the type described above which enables machining operations to be carried out with maximum efficiency.

The above and other objects and advantages of this invention will be more readily apparent from the following description with reference to the accompanying drawings in which:

FIG. 1 is a plan view showing one type of apparatus embodying this invention;
FIG. 2 is a section taken along line 2—2 of FIG. 1;
FIG. 3 is a section taken along line 3—3 of FIG. 4;
FIG. 4 is a section, on an enlarged scale, taken along line 4—4 of FIG. 1; and
FIG. 5 is a partial elevational view, partly in section, showing a bottle top fitted onto the neck of a bottle finished in accordance with this invention.

Referring in detail to the drawings, in FIG. 1 is an overall view of a machine embodying this invention. The machine comprises a base plate 6 on which is mounted an air operated cylinder 8. The cylinder serves as the motivating instrument for positioning bottles, on which work is to be done, relative to a machine tool, such as a reaming and facing tool, as shown at 7 in FIG. 3 and a knife 9 for cutting off majority of flash and bottle neck.

As shown, the cylinder reciprocates a toothed rack 10 extending from the end of the piston rod 11; the rack is meshed with a pinion gear 12. The pinion gear is mounted to rotate shaft 14 (FIG. 2), journaled at its opposite ends by bearings 16 and 18. The bearing 16 is seated in a recess in plate 20, bolted to the upper surface of a block 22, in turn secured to the base plate 6 on opposite sides of slot 23 in the plate 6. The other bearing 18 is similarly disposed within a recess in arm 24 which extends from the lower portion of the block 22.

The pinion 12, engaged with the rack 10, serves to drive a larger gear 28 disposed within a cylindrical recess 30 in the base plate 6. The gear 28 is mounted to rotate with the shaft 14 whereby pinion 12 and gear 28 rotate together.

The recess 30 communicates with a contiguous recess 32, also provided in the base plate 6. The gear 28 is drivingly engaged with the gear 34 disposed in recess 32.

Means is provided for screwing the bottle into position for the machining operation. As shown, an internally threaded nut or annular disk 36 is disposed within the ring gear 34 and rotates therewith. The inner wall of the disk is threaded as shown at 38 in FIG. 3 to mate with the correspondingly threaded bottle neck 40 of the bottle 42.

Recess 32 opens through the plate 6 providing shoulders 44 and 46. As shown, the disk and gear are rotatably supported by bearing 45 disposed on the shoulder 46. A retaining ring 48 is secured in place on the shoulder 46 by screws 47 maintaining the rotating elements in place.

Means is provided for holding and guiding plastic bottles for threading into the rotating threaded disk 36. In the embodiment shown, the holding means comprises a bracket indicated generally as 49, having a base ring 50, upwardly extending rods 52, and a top ring 54. The base ring 50 is appropriately secured to the retaining ring 48. The rods 52 extend upwardly and outwardly from the base ring 50 so the bottle is guided to bring its neck portion into engagement with the threads of disk 36. The uprights are arranged and configured to prevent rotation of the bottle while it is being threaded into the disk 37. This may be accomplished by engagement with the handle or other body contour of the bottle.

Means is provided for automatically controlling the operation of the bottle holding fixture. As shown in FIG. 1, a limit switch 56 is mounted on the plate 6 and disposed for engagement with the outer edge of a plate 58 carried on the rack adjacent its outer end. As shown, a stop 59 is provided for engagement by the rack 10 at the outer end of its stroke. The plate 58 is relieved, as shown at 62, to effect actuation of the switch 56 in response to the position of travel of the rack 10. The limit switch actuation plate 58 is adjustable longitudinally of the rack to provide actuation of the switch 56 in the proper time sequence in the operating cycle of the apparatus.

Another limit switch 64 (FIG. 4) is disposed to be actuated by insertion and removal of the bottle 42 into the bracket 49.

A pair of limit switches 66 and 68 are vertically spaced adjacent the path of travel of the finishing tool 7 to automatically monitor the operating positions of the tool and to actuate the next step in the finishing operation. The tool 7 may be provided with switch actuator arm 69, such as shown in FIG. 4.

A pair of horizontally spaced limit switches 70 and 72 are provided to similarly monitor and control the operation of the cut-off knife 9, as shown in FIG. 3.

In operation bottles are introduced neck down, into the holding bracket which guides the bottle so that its neck is disposed to engage the threaded opening 38 of the disk 36. When the bottle is so introduced it actuates limit switch 64; this causes cylinder 8 to be energized to drive the rack so that the threaded disk is rotated to draw the neck of the bottle through its opening and hold it in position for the cutting and finishing operations.

When cylinder 8 is actuated, the rack is retracted from its FIG. 1 position, rotating pinion 12 and gear 28. Since the gear 28 is meshed with gear 34, the latter also rotates. Rods 52 of the bracket 49 prevent the bottle rotating. The bottle is thus screwed into the threaded disk until its lower end extends below the underside of the disk, as shown in FIG. 3.

As the rack is retracted from its FIG. 1 position, limit switch 56 is actuated by engagement with the surface 62 of the plate 58. Switch 56 energizes a drive unit (not shown) to advance the neck knife 9 which cuts off the major portion of the flash and bottle neck. At the end of its stroke, the neck knife 9 engages a limit switch 70 which serves to cause the knife drive unit (not shown) to reverse whereby the knife is retracted until it engages limit switch 72. Limit switch 72 energizes the drive unit for the facing tool 7 until it reaches the end of its stroke where it operates limit switch 68. After the bottle neck has been reamed and machined, limit switch 68 causes the drive of the facing tool to reverse until the tool has been retracted to the lower end of its stroke where it engages limit switch 66. At this point, since the cutting and finishing operations have been completed, actuation of the limit switch 66 causes the drive cylinder 8 to drive the rack to its outer position. This causes the nut to eject the bottle, whereby the operator can simply remove it from the bracket 49. At its outer end, the rack engages the stop 59.

It will be noted that the rack 10 is reciprocated along a guideway in the form of a guide bar 78 fastened to the plate 6. The bar is of L-shaped construction as shown in FIG. 4; a retaining plate is secured to the upper surface of the bar 78 and together therewith forms a channel for the rack 10.

Threaded disk 36 provides a true reference for clamping the bottle during machining since the end of the bottle neck should lie in a plane *a* (FIG. 5) normal to the axis *b* of the screw thread formed on the neck of the bottle.

The fixture embodying this invention is thus independent of shape variation and/or inaccuracies in the configuration and contours of the bottle. Only the thread itself is used as the reference datum for the machining operation.

Having thus described this invention, what is claimed is:

1. Apparatus for finishing plastic bottles with threaded necks comprising a rotatable but axially stationary internally threaded ring, means for reversibly rotating said ring, means for preventing rotation of said bottle in response to rotation of said ring for threading said bottle into and out of said ring, and means disposed coaxially of said ring for machining the bottle neck.

2. Apparatus for finishing plastic bottles with threaded necks comprising a base, an internally threaded ring rotatably supported in said base and held thereby against axial movement, said ring having an axial length less than the threaded neck, means for automatically, reversibly rotating said ring, a bracket for receiving said bottles for guiding the necks thereof into engagement with the thread of said ring, said bracket having means for preventing rotation of the bottle whereby its neck is drawn axially through the ring, and means disposed on the opposite side of said ring for machining the end surface of said bottle neck to a plane perpendicular to the axis of thread on the bottle neck.

3. Bottle holding fixture for use in finishing plastic bottles with threaded necks comprising an internally threaded and externally toothed annular disk, means rotatably supporting said disk and retaining said disk against axial movement, means engaged with the externally toothed portion of said disk for reversibly rotating said disk, and a bracket for holding bottles with their necks engaged with the threaded disk, said bracket being configured to prevent rotation of the bottles in response to rotation of said disk.

4. Bottle holding fixture as set forth in claim 3 in which said disk has an axial length less than the length of the bottle necks.

5. Apparatus for finishing plastic bottles having neck portions with threads formed thereon comprising a rotatable disk having an internally threaded bore, gear means for rotating said disk, a reciprocably operated rack drivingly meshed with said gear means to rotate said disk, a machining tool disposed coaxially of said threaded bore, said bore having an axial length less than the length of said bottle neck, means for automatically controlling the operation of said rack and machine tool for machining in the necks of said bottles.

References Cited by the Examiner
UNITED STATES PATENTS 2,211,183 8/1940 Tytus et al. _____ 77—73 X
3,127,636 4/1964 Heider.

WILLIAM W. DYER, Jr., *Primary Examiner.*

FRANCIS S. HUSAR, *Examiner.*